United States Patent [19]

Usui

[11] Patent Number: 5,619,293

[45] Date of Patent: Apr. 8, 1997

[54] IMAGE BLUR SUPPRESSION DEVICE OF A CAMERA WHICH ALIGNS AN IMAGE BLUR SUPPRESSION LENS AND ACTUATOR BASED ON ANTICIPATED SAG OF SUPPORTING MEMBERS

[75] Inventor: Kazutoshi Usui, Kawasaki, Japan

[73] Assignee: Nikon Corporation, Tokyo, Japan

[21] Appl. No.: 491,580

[22] Filed: Jun. 16, 1995

[30] Foreign Application Priority Data

Jun. 16, 1994 [JP] Japan ..................................... 6-134054
Jun. 16, 1994 [JP] Japan ..................................... 6-134076

[51] Int. Cl.⁶ .................................................. G03B 39/00
[52] U.S. Cl. ............................................. 396/55; 359/554
[58] Field of Search .............................. 354/70, 195.12, 354/202, 400, 430; 348/208; 359/554

[56] References Cited

U.S. PATENT DOCUMENTS

| | | | |
|---|---|---|---|
| 5,084,724 | 1/1992 | Maeno ...................................... | 354/430 |
| 5,153,633 | 10/1992 | Otani ....................................... | 354/430 |
| 5,266,988 | 11/1993 | Washisu ................................... | 354/70 |
| 5,479,236 | 12/1995 | Tanaka .................................... | 354/430 |

FOREIGN PATENT DOCUMENTS

7-152003  6/1995  Japan .
07152003A  6/1995  Japan .

Primary Examiner—A. A. Mathews
Attorney, Agent, or Firm—Staas & Halsey

[57] ABSTRACT

An image blur suppression device which moves an image blur suppression lens to compensate for image blur, such as in a camera. A supporting member supports the image blur suppression lens and experiences sag due to gravity. The image blur suppression lens is positioned to approximately align the optical center of the image blur suppression lens with the optical axis of a main optical system in accordance with the amount of sag of the supporting member. Also, the image blur suppression lens can be positioned to approximately align the optical center of the image blur suppression lens with the center of the range of motion of the image blur suppression lens in accordance with the amount of sag of the supporting member. Additionally, an actuator can generate a force between a magnet and a coil to move the image blur suppression lens. The image blur suppression lens is positioned to approximately align the magnetic center of the magnet with the center of the winding of the coil in accordance with the amount of sag of the supporting member. Further, a position detecting unit can detect the position of the image blur suppression lens by emitting light from a light emitting unit, through a slit, and to a light receiving element. The image blur suppression lens is positioned to approximately align the center of the light receiving range with the approximate center of the slit in accordance with the amount of sag of the supporting member.

20 Claims, 10 Drawing Sheets

IMAGE BLUR SUPPRESSION DEVICE OF A CAMERA WHICH ALIGNS AN IMAGE BLUR SUPPRESSION LENS AND ACTUATOR BASED ON ANTICIPATED SAG OF SUPPORTING MEMBERS

BACKGROUND OF THE INVENTION

1. Field of the Invention

The present invention relates to an image blur suppression device of a camera for suppressing image blur due to shaking of the photographer's hands during photography. More particularly, the present invention relates to the alignment of an image blur suppression lens and the alignment of an electromagnetic actuator of an image blur suppression device, based on the sag of supporting members.

2. Description of the Related Art

Image blur suppression devices suppress, or reduce, blurring of an image projected onto an image plane by an optical system. Motion is typically imparted to the optical system by vibrations affecting the optical system or in a surrounding holding member. In general, conventional image blur suppression devices cause an image blur suppression lens to shift counter to the motion of the optical system so as to shift the image projected by the optical system relative to the optical system.

Blurring of an image on film (called "image blur") is an undesirable consequence of vibrations affecting a camera. Such vibrations are typically caused by the shaking of the photographer's hands during exposure of the film. Conventional cameras suppress image blur by moving an image blur suppression lens in a direction which is perpendicular to the optical axis, thereby compensating for detecting vibrations. For example, Japanese Patent Publication Kokai 2-66536 discloses a camera in which an image blur suppression lens is supported by elastic support rods and, while supported, is moved in a direction perpendicular to the optical axis by an electromagnetic actuator.

An electromagnetic actuator generally includes a magnet and a coil. The magnet is fixed to a base and the coil is connected to the image blur suppression lens. An electromagnetic force is generated when an electric current is supplied to the coil, thereby moving the image blur suppression lens.

The use of the elastic support rods makes it unnecessary to rely on complicated and expensive slide and drive mechanisms to move the image blur suppression lens. Also, the use of elastic support rods makes the camera lighter and more compact.

However, a camera having elastic support rods experiences problems due to the force of gravity acting on the support rods. For example, the most common photographic posture is for the photographer to hold the camera so that the optical axis of the photographic optical system is approximately parallel to the earth's surface. During this positioning, the elastic support rods sag due to the weight of the support rods and the weight of the image blur suppression lens. As a result, the optical center of the image blur suppression lens becomes undesireably offset from the optical axis of the photographic optical system. This offset also causes an undesirable offset between the magnet and the coil of the electromagnetic actuator.

Further, the process of exposing film inside the camera to light from a photographic subject requires the steps of (a) compensating for the offset of the image blur suppression lens by performing a centering process to align the optical axis of the image blur suppression lens with the optical axis of the photographic optical system and, after the centering process is complete, (b) moving the image blur suppression lens to compensate for detected vibration. Therefore, as a result of a large offset, the centering process requires a large amount of time and consumes a large amount of electricity. Also, a large amount of time for centering causes the start of exposure to be delayed.

SUMMARY OF THE INVENTION

It is therefore an object of the present invention to reduce the centering process time of an image blur suppression device and reduce the amount of electricity consumed to drive an image blur suppression lens.

It is an additional object of the present invention to provide an image blur suppression device which aligns an image blur suppression lens with the optical axis of a photographic optical system in accordance with the anticipated amount of sag of supporting members.

Further, it is an object of the present invention to provide an image blur suppression device which aligns an electromagnetic actuator in accordance with the anticipated amount of sag of supporting members.

Objects of the present invention are achieved by providing an image blur suppression device including an image blur suppression lens which is moveable to compensate for image blur. A supporting member supports the image blur suppression lens and experiences sag due to gravity. The image blur suppression lens is positioned to approximately align the optical center of the image blur suppression lens with the optical axis of a main optical system in accordance with the amount of sag of the supporting member. Also, the image blur suppression lens can be positioned to approximately align the optical center of the image blur suppression lens with the center of the range of motion of the image blur suppression lens in accordance with the amount of sag of the supporting member.

Objects of the present invention are also achieved by providing an image blur suppression device including an image blur suppression lens which is moveable to compensate for image blur. A drive force generator includes a magnet and a coil. Either the magnet or the coil is fixed to the image blur suppression lens. The drive force generator generates an electromagnetic force between the magnet and the coil to move the image blur suppression lens. A supporting member supports the image blur suppression lens and experiences sag due to gravity. The image blur suppression lens is positioned to approximately align the magnetic center of the magnet with the center of the winding of the coil in accordance with the amount of sag of the supporting member.

Moreover, objects of the present invention are achieved by providing an image blur suppression device including a position detecting unit. The position detecting unit includes a light emitting element, a light receiving element, and a slit forming member having a slit and being positioned between the light emitting element and the light receiving element. The slit forming member is connected to the image blur suppression lens. The position detection unit detects the position of the image blur suppression lens by emitting light from the light emitting unit, through the slit of the slit forming member, and to the light receiving element. A supporting member supports the image blur suppression lens and experiences sag due to gravity. The image blur suppression lens is positioned to approximately align the center of the light receiving range of the light receiving element with the approximate center of the slit of the slit forming member in accordance with the amount of sag of the supporting member.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made to the figures, wherein like reference numerals represent similar structures or processes throughout the drawings.

Figure 1A:
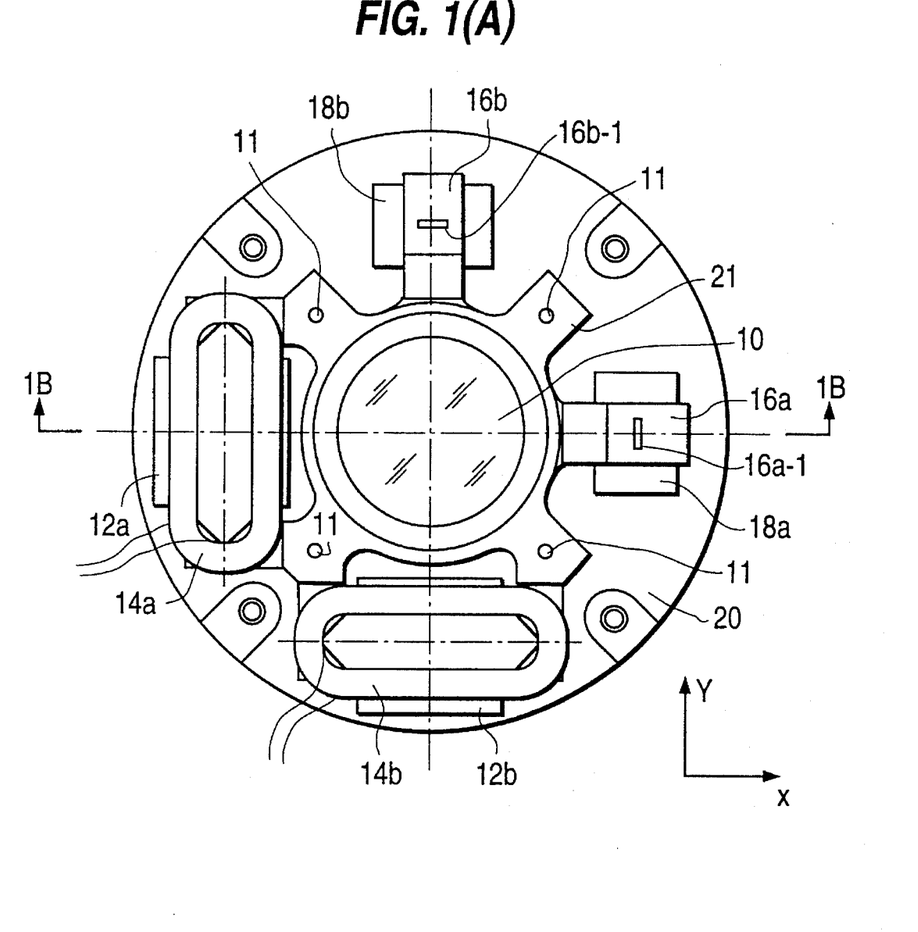
FIG. 1(A) is a diagram illustrating an image blur suppression device of a camera, according to an embodiment of the present invention.
Figure 1B:
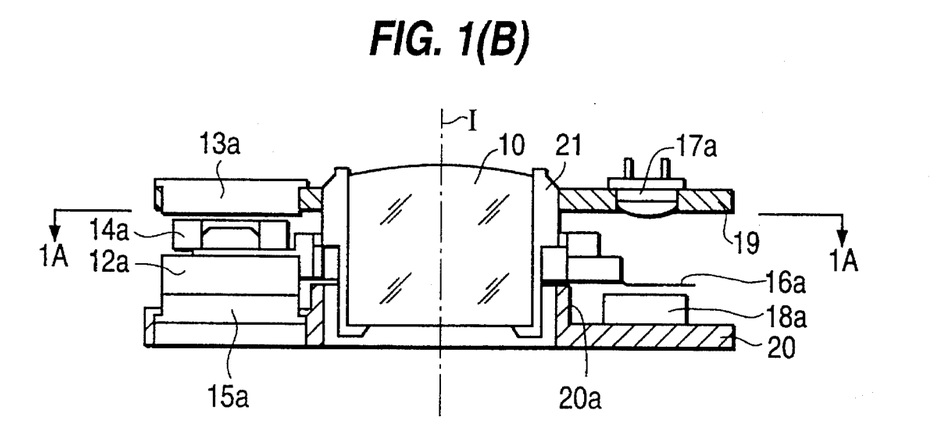
FIG. 1(B) is a cross-section along lines 1B—1B of the image blur suppression device illustrated in FIG. 1(A), according to an embodiment of the present invention.

FIG. 1(A) is a diagram illustrating an image blur suppression device of a camera, according to an embodiment of the present invention, and FIG. 1(B) is a cross-section along lines 1B—1B of the image blur suppression device illustrated in FIG. 1(A), according to an embodiment of the present invention. Moreover, FIG. 1(A) is a cross-section along lines 1A—1A in FIG. 1(B). As illustrated in FIGS. 1(A) and 1(B), a lens tube 21 supports an image blur suppression lens 10. Lens tube 21 is supported by the ends of four support rods 11. Each support rod 11 is made of an elastic material of an equal length in a cantilever fashion.

An LED 17a, such as an infrared emitting LED, is attached to a top plate 19. A position detection sensor (PSD) 18a is attached to a bottom plate 20. Position detection sensor 18a is preferably a conventional light receiving device. Slit part 16a is used to detect motion of image blur suppression lens 10 in the X axis direction, and has a slit 16a-1 extending in the X axis direction. Slit part 16a is attached to lens tube 21 and is arranged between LED 17a and position detection sensor 18a. Light radiated from LED 17a passes through slit 16a-1 and enters position detection sensor 18a. Thus, the movement of slit 16a-1 (that is, the motion of image blur suppression lens 10) affects the motion of the light incident on position detection sensor 18a. The light received by position detection sensor 18a is converted to an output current by position detection sensor 18a. In this manner, the motion of image blur suppression lens 10 can be detected in the X direction. Therefore, LED 17a, light receiving device 18a and slit part 16a together form a position detection unit to detect the position of image blur suppression lens 10.

Similarly, a position detection sensor 18b is attached to bottom plate 20 and has a corresponding LED (not illustrated) attached to top plate 19. Position detection sensor 18b is preferably a conventional position detection sensor. Slit part 16b is used to detect motion of image blur suppression lens 10 in the Y axis direction, and has a slit 16b-1 extending in the Y axis direction. Slit part 16b is attached to lens tube 21 and is arranged between position detection sensor 18b and the corresponding LED (not illustrated). Light radiated from the corresponding LED passes through slit 16b-1 and enters position detection sensor 18b. Thus, the movement of slit 16b-1 (that is, the motion of image blur suppression lens 10) affects the motion of the light incident on position detection sensor 18b. The light received by position detection sensor 18b is converted to an output current by position detection sensor 18b. In this manner, the motion of image blur suppression lens 10 can be detected in the Y direction. The range of motion of image blur suppression lens 10 is limited by a motion limiting part 20a rising from bottom plate 20. FIG. 1(B) also illustrates the optical axis I of a photographic optical system (not illustrated).

A coil 14a is wound in a direction parallel to the optical axis I and is positioned in the vicinity of a magnet 12a. Yokes 13a and 15a are made of a material such as iron. Yoke 13a is positioned to oppose magnet 12a via coil 14a, while yoke 15a is attached to magnet 12a. Therefore, when a current is applied to coil 14a, a force parallel to the X-axis is generated. Thus, magnet 12a and coil 14a function to move image blur suppression lens 10 in the X-axis direction. Similarly, a coil 14b is wound in a direction parallel to the optical axis I and is positioned in the vicinity of a magnet 12b. A yoke (not illustrated) is positioned to oppose magnet 12b via coil 14b, while yoke (not illustrated) is attached to magnet 12b. Therefore, when a current is applied to coil 14b, a force parallel to the Y-axis is generated. Thus, magnet 12b and coil 14b function to move image blur suppression lens 10 in the Y-axis direction.

Figure 2:
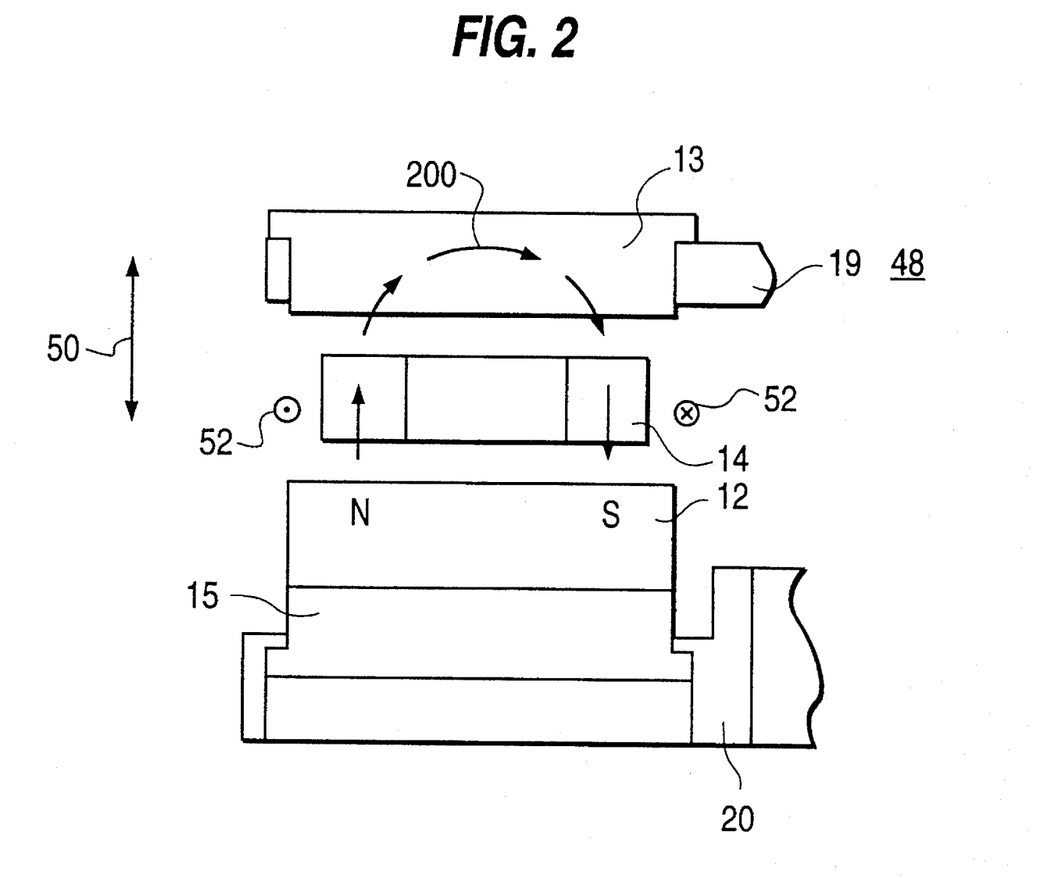
FIG. 2 is a diagram illustrating an electromagnetic actuator to drive an image blur suppression lens of an image blur suppression device of a camera as in FIGS. 1(A) and 1(B), according to an embodiment of the present invention.

FIG. 2 is a diagram illustrating an electromagnetic actuator 48 to drive an image blur suppression lens of an image blur suppression device of a camera as in FIGS. 1(A) and 1(B), according to an embodiment of the present invention. In FIG. 2, the arrow 50 represents the direction of the optical axis I. The electromagnet actuator illustrated in FIG. 2 represents the magnet 12a and corresponding coil 14a combination, or the magnet 12b and corresponding coil 14b combination. Therefore, in FIG. 2, a magnet 12 represents either magnet 12a or 12b, a coil 14 represents either coil 14a or 14b, and a yoke 13 represents either yoke 13a or 13b. Thus, if magnet 12 represents magnet 12a, then coil 14 represents coil 14a and yoke 13 represents yoke 13a. Similarly, if magnet 12 represents magnet 12b, then coil 14 represents coil 14b and yoke 13 represents yoke 13b. Magnet 12 is magnetized to have two poles, north (N) and south (S). Coil 14 is wound in a direction parallel to the optical axis and is positioned in the vicinity of magnet 12. Yokes 13 and 15 are made of a material such as iron. Yoke 13 is placed to oppose magnet 12 via coil 14. Yoke 15 is attached to magnet 12. Magnet 12, coil 14, and yokes 13 and 15 form a magnetic circuit functioning as an electromagnetic actuator with a magnetic flux as indicated by arrows 200. When an electric current is applied to coil 14, an electromagnetic force is generated perpendicular to the directions of the electric current and the magnetic flux, according to the Fleming's left-hand rule for the direction of electromagnetic force. In FIG. 2, arrow points 52 illustrate the direction of the electric current. Actuator 48 can also be referred to as a "drive force generator" which generates an electromagnetic force between magnet 12 and coil 14 to move image blur suppression lens 10.

Figure 3A:
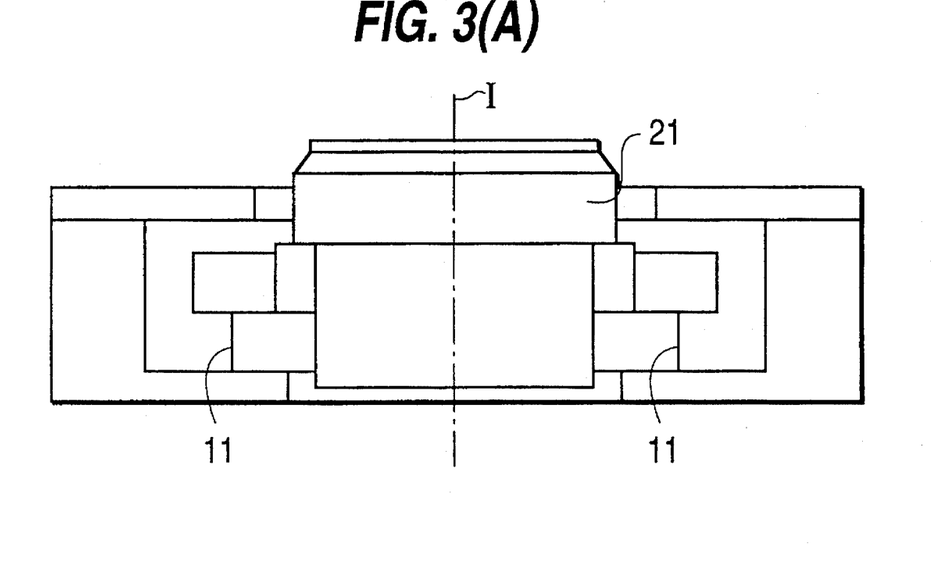
FIGS. 3(A) and 3(B) are diagrams illustrating the movement of a lens tube or an image blur suppression lens of an image blur suppression device of a camera, according to an embodiment of the present invention.
Figure 3B:
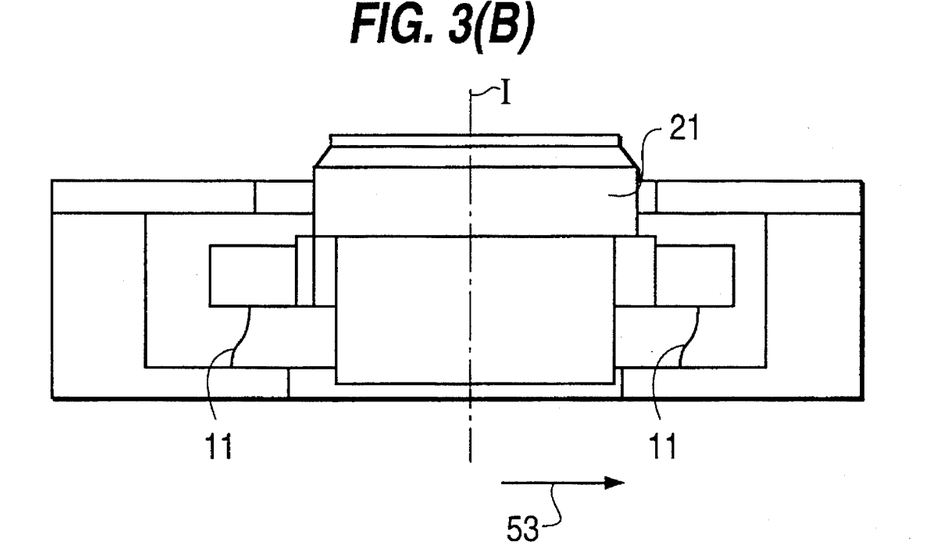

FIGS. 3(A) and 3(B) are diagrams illustrating the movement of lens tube 21 and image blur suppression lens 10, according to an embodiment of the present invention. As previously described, lens tube 21 supports image blur suppression lens 10, and lens support tube 21 is supported by the ends of four support rods 11 made of an elastic material. Therefore, due to the elasticity of support rods 11, lens tube 21 can move in a direction approximately perpendicular to the optical axis I from a position as illustrated in FIG. 3(A) to a position as illustrated in FIG. 3(B). From FIGS. 3(A) to 3(B), lens tube 21 is moved in the direction of arrow 53. In FIG. 3(A), support rods 11 are illustrated as being "straight". By contrast, in FIG. 3(B), support rods 11 are illustrated as being "curved". Thus, as can be seen by comparing FIG. 3(A) to FIG. 3(B), support rods 11 are elastically deformed during the motion from FIG. 3(A) to FIG. 3(B).

Pitching and yawing motions occurring in a camera causes relative motion of the optical axis of the photographic optical system, thereby resulting in image blur on the film surface. Therefore, image blur suppression lens 10 is shifted to cancel out this motion of the optical axis motion and prevent image blur. The range of motion of image blur suppression lens 10 is determined by motion limiting part 20a (see FIG. 1) rising from bottom plate 20.

Figure 4:
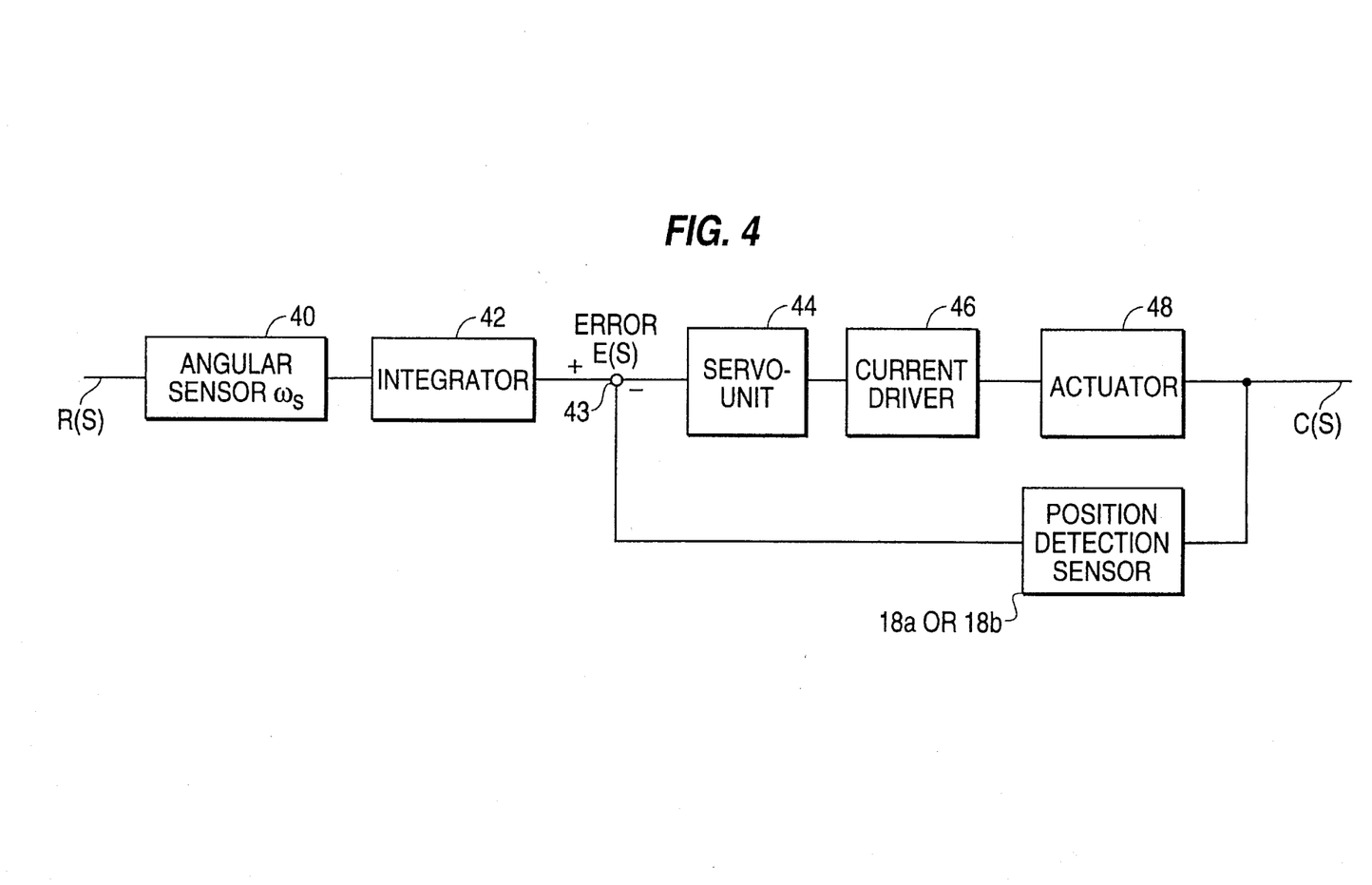
FIG. 4 is a block diagram illustrating an image blur suppression device of a camera, according to an embodiment of the present invention.

FIG. 4 is a block diagram illustrating an image blur suppression device of a camera, according to an embodiment of the present invention. A conventional angular sensor 40 is mounted in the camera and detects pitch and yaw motions of the camera. Angular sensor 40 is typically a conventional piezoelectric vibration type unit. Angular sensor 40 receives an input signal R(S) corresponding to vibrations affecting the camera. These vibrations are typically caused by the shaking of a photographer's hand. Angular sensor 40 then detects the Coriolis force of the input signal R(S) and produces a corresponding output. The output of angular sensor 40 is integrated by a conventional integrator 42 to determine the swing angle of the camera and target position information for shifting image blur suppression lens 10. To move image blur suppression lens 10 according to the target position information, a conventional difference determining mechanism 43 determines the difference between the target position information and the current position information of image blur suppression lens 10, and produces a corresponding difference signal. The difference signal is provided to a conventional servo unit 44. Servo unit 44 then sends a signal to a conventional current driver 46 to compensate for the difference between the target position information and the current position of image blur suppression lens 10. Current driver 46 generates a current corresponding to an input voltage to be applied to coil 14 of electromagnetic actuator 48. A conventional voltage driver could be used instead of current driver 46 to supply a current to coil 14 of electromagnetic actuator 48. Electromagnetic actuator 48 then produces an electromagnetic force to move image blur suppression lens 10 in a direction approximately perpendicular to the optical axis of the photographic optical system according to the current applied to coil 14. The motion of image blur suppression lens 10 is detected by position detection sensor 18a or 18b and fed back to servo unit 44 via difference determining mechanism 43. In this manner, image blur suppression lens 10 is moved to cancel out the image blur in correspondence with the shaking of the camera.

A conventional release button (not illustrated) is generally mounted on the top of the camera so that the photographer can push the release button to take a photograph. The release button typically has a half-push position and a full-push position. Various photographic preparatory processes are performed when the photographer pushes the release button to the half-push position. Such preparatory processes can include conventional photometry and conventional rangefinding. A conventional exposure operation is performed when the photographer pushes the release button to the full-push position.

Figure 5:
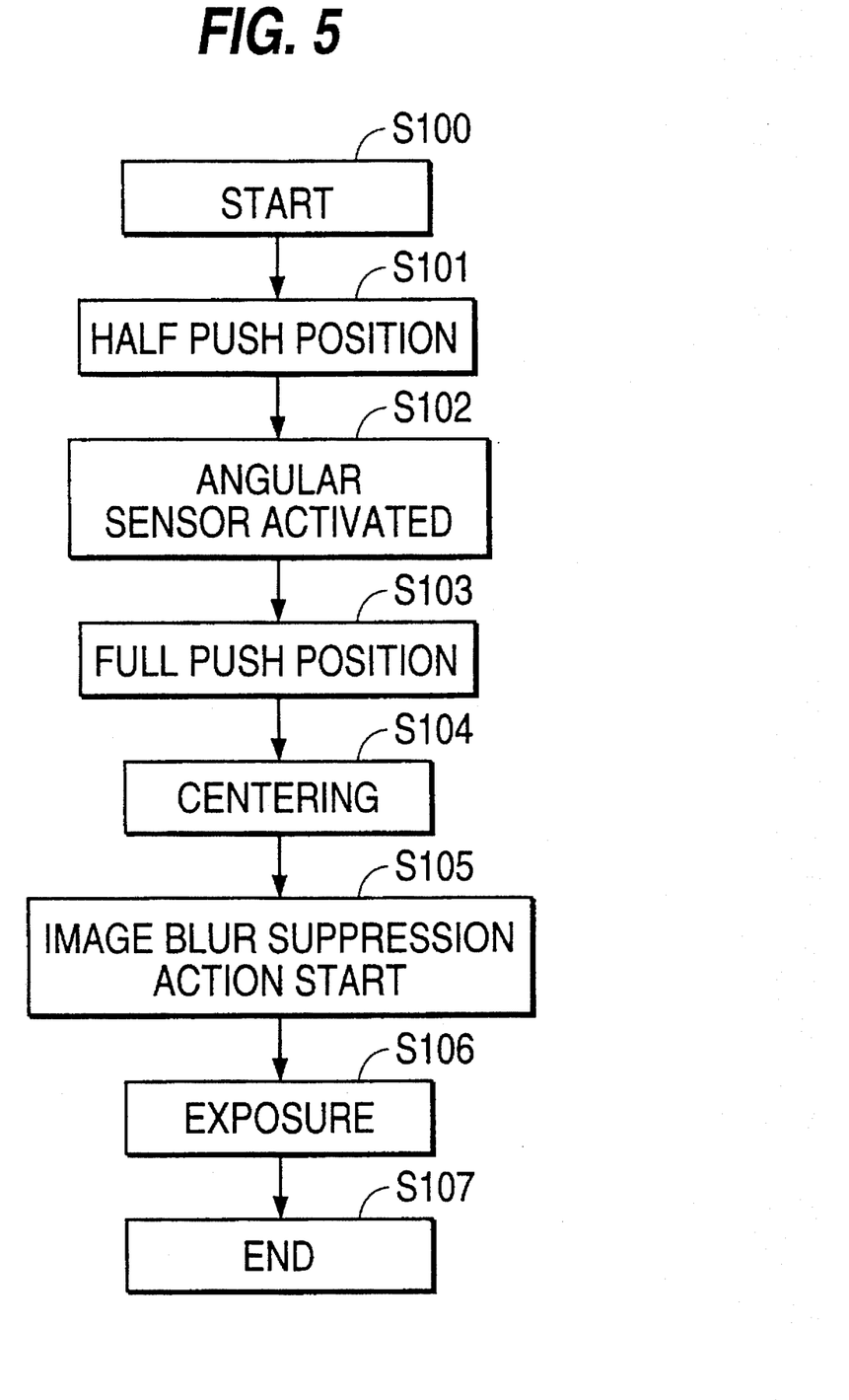
FIG. 5 is a flow chart illustrating an image blur suppression sequence in a camera from the time the camera release button is pushed from a half-push position to the time when the exposure is completed, according to an embodiment of the present invention.

FIG. 5 is a flow chart illustrating an image blur suppression sequence in a camera from the time the release button is pushed from the half-push position to the time when the exposure is completed by pushing the release button to the full-push position, according to an embodiment of the present invention. The process starts in step S100 and moves to step S101. In step S101, the release button is pressed to the half-push position. From step S101, the process moves to step S102 where angular sensor 40 is activated to start a conventional image blur detection process by detecting the amount of vibration affecting the camera. From step S102, the process moves to step S103 where the release button is pushed to the full-push position. From step S103, the process moves to step S104 where a conventional centering process is performed to move image blur suppression lens 10 to a center position. The centering of image blur suppression lens 10 is normally performed by aligning the center of slits 16a-1 and 16b-1 with a light receiving center position of position detection sensors 18a and 18b, respectively. This centering process is performed to position image blur suppression lens 10 at the center of its motion range prior to the movement of image blur suppression lens 10 so that image blur suppression lens can move evenly in any direction.

After the centering process is completed, the process moves to step S105 where a conventional image blur suppression process is started. In other words, in step S105, image blur suppression lens 10 is moved in a direction approximately perpendicular to the optical axis to compensate for image blur. While image blur suppression is being performed, the process moves to step S106 where a conventional exposure operation is initiated after a specific time from the start of the image blur suppression process. After the exposure operation is completed, the process ends at step S107. In this manner, a photograph is taken while image blur suppression lens 10 is shifted to compensate for image blur.

The centering process of step S104 is performed for several reasons. First, image blur suppression lens 10 must be able to move evenly in any direction to respond to shaking or vibration in arbitrary directions. Therefore, image blur suppression lens 10 should be located in the center of the motion range before image blur suppression lens 10 is shifted to compensate for image blur. Second, the resolution of the overall photographic optical system is better when the optical center of image blur suppression lens 10 is closer to the optical axis of the photographic optical system. Therefore, the centering process functions to approximately align the optical center of image blur suppression lens 10 with the optical axis of the photographic optical system.

Figure 6:
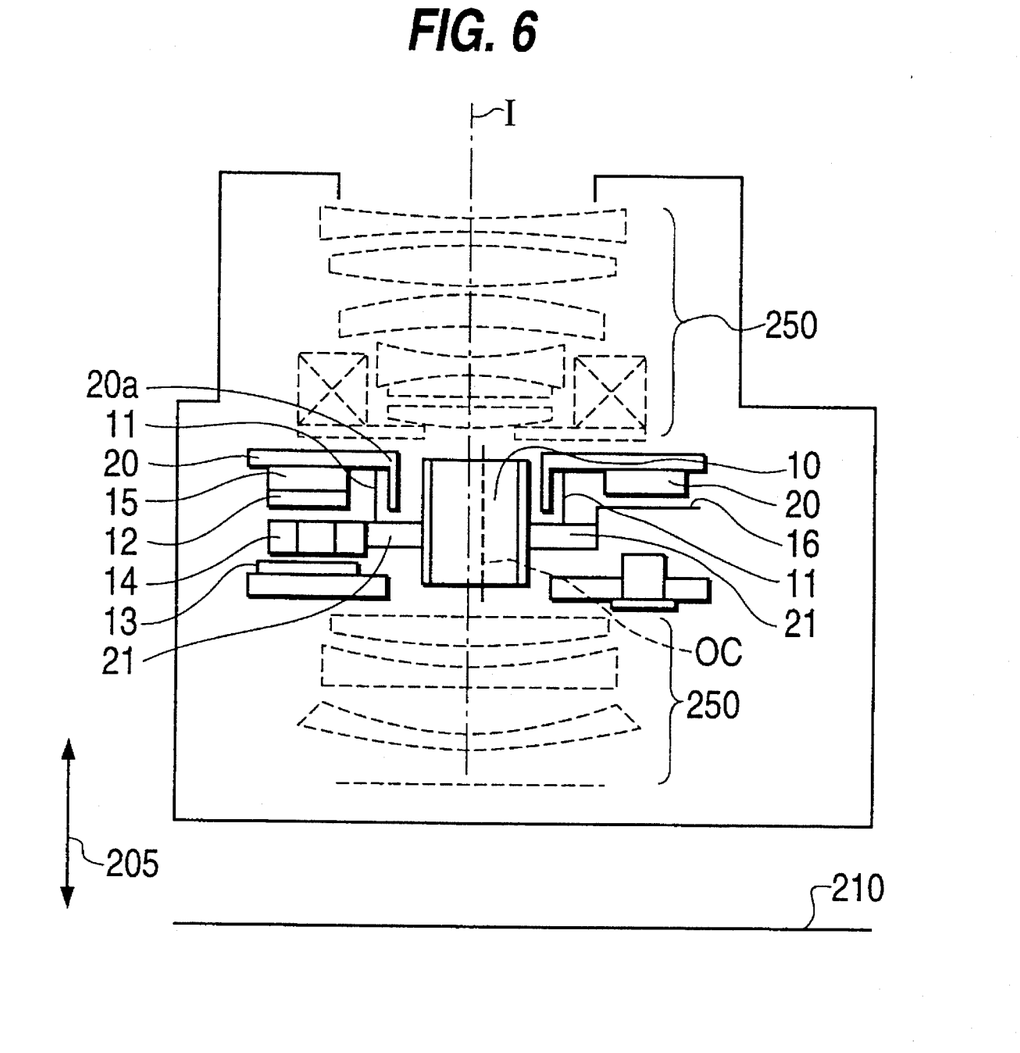
FIG. 6 is a diagram illustrating a camera in which the optical axis of the photographic optical system is positioned perpendicular to the earth's surface.

FIG. 6 is a diagram illustrating a camera in which the optical axis I of a photographic optical system 250 (illustrated by dashed lines representing various lenses) is positioned in a vertical direction 205 (perpendicular) with respect to ground 210, where ground 210 represents the surface of the earth. Therefore, photographic optical system 250 is perpendicular to ground 210. In effect, the camera is pointing "up" towards the sky. In FIG. 6, slit part 16 represents slit parts 16a and 16b. As illustrated in FIG. 6, the optical center OC of image blur suppression lens 10 does not match the center of the motion range of image blur suppression lens 10, nor does the optical center OC match the optical axis I of photographic optical system 250. As illustrated in FIG. 6, the optical center OC of image blur suppression lens 10 is located slightly to the "right" of the optical axis I. Thus, image blur suppression lens 10 is mounted in an offset position relative to photographic optical system 250. Support rods 11 are illustrated in FIG. 6 as being "straight" and not yet elastically deformed.

FIG. 6 represents an uncommon photographic circumstance where the camera is pointing upward with respect to ground 210. Under normal photographic circumstances, photography is performed while the optical axis of photographic optical system 250 is positioned perpendicular to the vertical direction 205. That is, photography is usually performed with photographic optical system 250 positioned parallel to ground 210.

Figure 7:
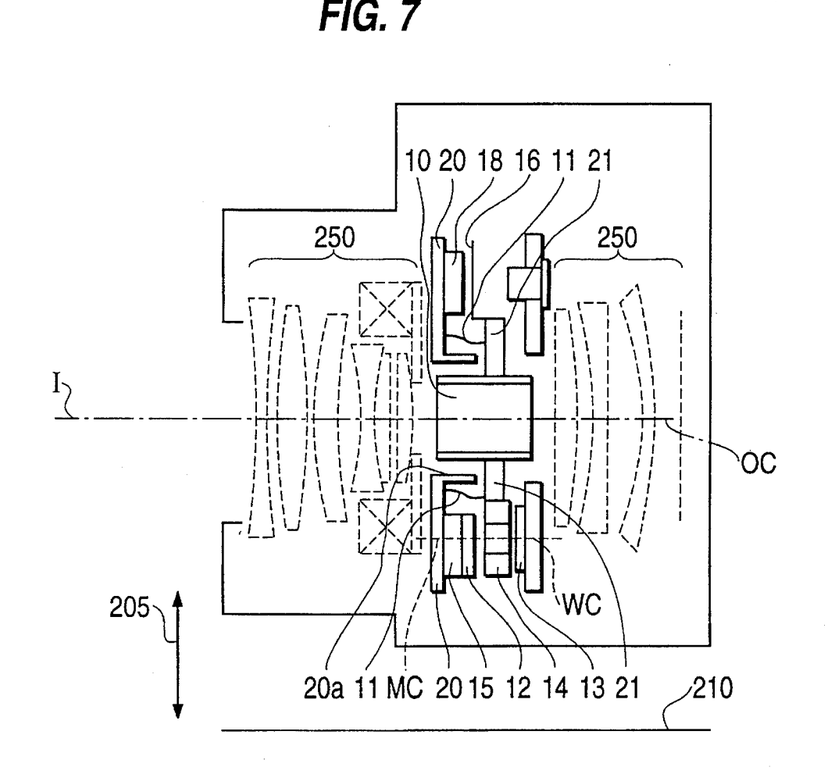
FIG. 7 is a diagram illustrating a camera in which the optical axis of the photographic optical system is positioned parallel to the earth's surface.

FIG. 7 is a diagram illustrating a camera in which the optical axis of photographic optical system 250 is positioned parallel to ground 210, according to an embodiment of the present invention. As illustrated in FIG. 7, gravity causes supporting rods 11 to develop elastic deformations due to the weight of support rods 11, the weight of image blur suppression lens 10, the weight of lens tube 21 and the weight of other components inside the camera. As a result and according to embodiments of the present invention, image blur suppression lens 10 drops in the direction of the force of gravity, thereby causing the center of the motion range of image blur suppression lens 10 to approximately coincide with the optical center OC of image blur suppression lens 10. At the same time, the optical axis I of photographic optical system 250 coincides approximately with the optical center OC of image blur suppression lens 10. Under this condition, the conventional centering process (see step S104 in FIG. 5) of image blur suppression lens 10 is performed in a relatively quick time. Also, the electricity consumption during the centering process is minimized.

Moreover, according to embodiments of the present invention, when image blur suppression lens 10 drops in the direction of gravity, the magnetic center (MC) of magnet 12 is arranged to approximately coincide with the winding center (WC) of coil 14. Further, the center of the detection range of position detection sensor 18 is arranged to approximately coincide with the center of the opening of slit 16a-1 and the center of the opening of slit 16b-1.

According to embodiments of the present invention, when the optical axis I of photographic optical system 250 is positioned approximately perpendicular to the vertical direction 205, the optical center OC of image blur suppression lens 10 aligns with both the center of its motion range and the optical axis I of photographic optical system 250. Even if the optical center OC of image blur suppression lens 10 is aligned with only one of the center of its motion range or the optical axis I, a similar effect can be obtained. For example, the time for the centering process can be reduced if the optical center OC of image blur suppression lens 10 is aligned with the center of its motion range and is not aligned with the optical axis I. Similarly, the time for the centering process can be reduced if the optical center OC of image blur suppression lens 10 is aligned with the optical axis I and is not aligned with the center of the motion range of image blur suppression lens 10.

According to an embodiment of the present invention, a supporting member 11 elastically supports image blur suppression lens 10 with a freedom to move in a direction approximately perpendicular to the optical axis I of photographic optical system 250. Image blur suppression lens 10 is mounted, based on the amount of sag due to gravity, so that the optical center OC of image blur suppression lens 10 is off the optical axis I of photographic optical system 250 when the elastic deformation of supporting member 11 is approximately zero. Moreover, according to an embodiment of the present invention, image blur suppression lens 10 is mounted in such a way that, due to sag of support member 11 resulting from gravity, the optical center OC of image blur suppression lens 10 approximately aligns with the optical axis I of photographic optical system 250 when the optical axis I is positioned approximately parallel to the ground. Therefore, image blur suppression lens 10 is mounted in a position which is originally offset from the optical axis I of photographic optical system 250. Under normal photographing circumstances, the optical center OC of the image blur suppression optical system approaches the optical axis I of photographic optical system 250 as the image blur suppression lens 10 sags due to its own weight.

According to an embodiment of the present invention, the optical center OC of image blur suppression lens 10 approximately aligns with the optical axis I of photographic optical system 250 when the optical axis I of photographic optical system 250 is approximately parallel to the ground. This position (where the optical axis I is approximately parallel to the ground) is the most commonly photographing posture.

According to an embodiment of the present invention, image blur suppression lens 10 is mounted so that, based on the amount of sag resulting from the force of gravity, the optical center OC of image blur suppression lens 10 is off the center of the motion range of image blur suppression lens 10 when the amount of elastic deformation of supporting member 11 is approximately zero.

According to an embodiment of the present invention, image blur suppression lens 10 is mounted so that, due to the sag of supporting member 11 resulting from the force of gravity, the optical center OC of image blur suppression lens 10 approximately aligns with the center of the motion range of image blur suppression lens 10 when the optical axis I of photographic optical system 250 is approximately parallel to the ground.

According to an embodiment of the present invention, image blur suppression lens 10 is mounted in a position which is offset from the center of its driving range. Under normal photographic circumstances, the optical center OC of image blur suppression lens 10 approaches the center of its driving range due to sag caused by its own weight.

Moreover, according to an embodiment of the present invention, when the optical axis I of photographic optical system 250 is approximately parallel to the ground, the motion range of image blur suppression lens 10 becomes widest as the optical center OC of image blur suppression lens 10 approximately aligns with the optical axis I of photographic optical system 250.

Therefore, according to the above embodiments of the present invention, the time to perform a conventional centering process is reduced since the optical center OC of the image blur suppression lens is approximately aligned with either or both of the optical axis I of photographic optical system 250 and the motion range of image blur suppression lens 10. Thus, the time and the power requirements for the centering process of image blur suppression lens 10 is reduced.

Further, according to embodiments of the present invention, the time and the power requirements for the centering process of image blur suppression lens 10 is reduced when the optical axis I of photographic optical system 250 is positioned approximately parallel to the ground.

Figure 8A:
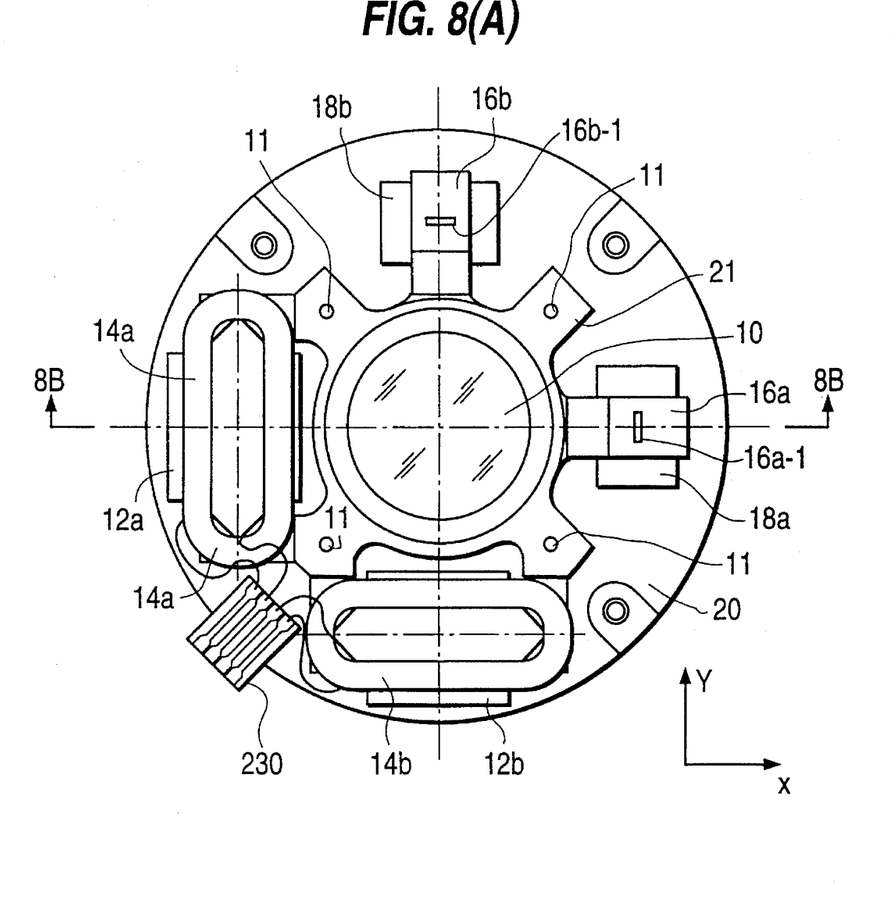
FIG. 8(A) is a diagram illustrating an image blur suppression device of a camera, according to an embodiment of the present invention.
Figure 8B:
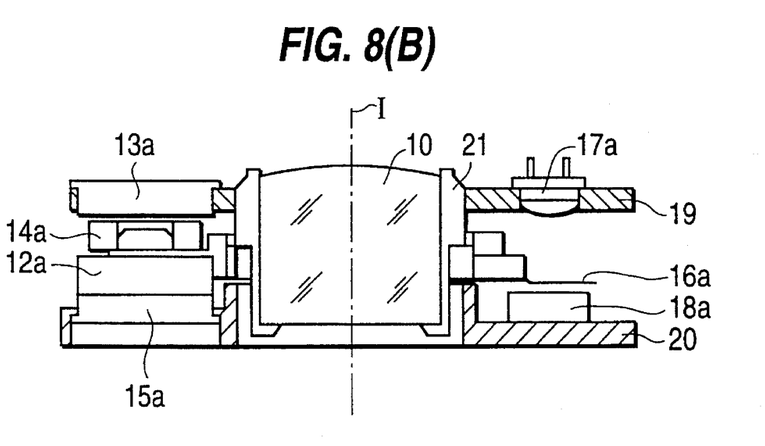
FIG. 8(B) is a cross-section along lines 8B—8B of the image blur suppression device illustrated in FIG. 8(A), according to an embodiment of the present invention.

FIG. 8(A) is a diagram illustrating an image blur suppression device of a camera, according to an embodiment of the present invention. FIG. 8(B) is a cross-section along line 8B—8B of the image blur suppression device illustrated in FIG. 8(A), according to an embodiment of the present invention. FIGS. 8(A) and 8(B) are similar to FIGS. 1(A) and 1(B), except that FIG. 8(A) illustrates a connector 230 for connecting current driver 46 to electromagnetic actuator 48.

Figure 9:
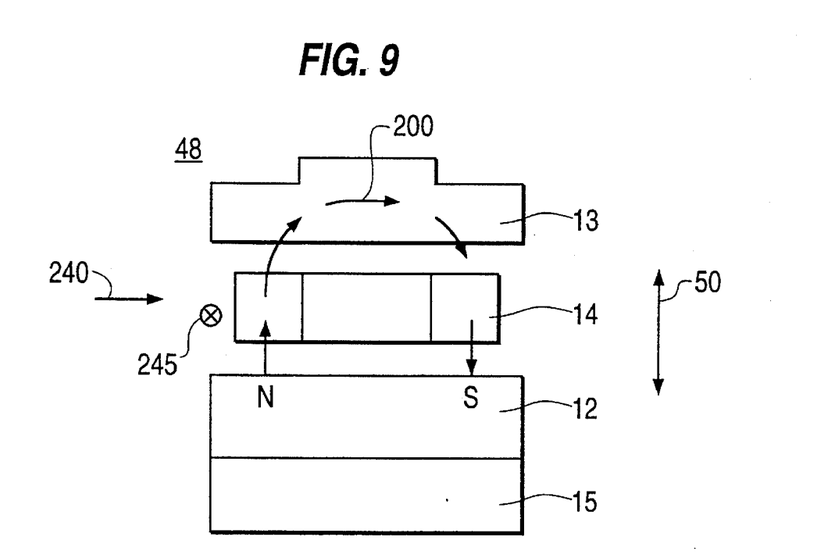
FIG. 9 is a diagram illustrating an electromagnetic actuator to drive an image blur suppression lens of an image blur suppression device of a camera as in FIGS. 8(A) and 8(B), according to an embodiment of the present invention.

FIG. 9 is a diagram illustrating an electromagnetic actuator to drive an image blur suppression lens of an image blur suppression device of a camera as in FIGS. 8(A) and 8(B), according to an embodiment of the present invention. In FIG. 9, magnet 12 is magnetized to have two poles, N and S. Coil 14 is wound in a direction parallel to the optical axis and placed in the vicinity of magnet 12. Yokes 13 and 15 are made of a material such as iron, and yoke 13 is placed opposing magnet 12 via coil 14. Yoke 15 is attached to magnet 12. Electromagnetic actuator 48 (comprising magnet 12, coil 14, and yokes 13 and 15) forms a magnetic circuit with a magnetic flux as indicated by arrows 200. When an electric current is applied to coil 14, an electromagnetic force 240 is generated perpendicular to the directions of the electric current 245 and the magnetic flux 200 according to Fleming's left hand rule. Therefore, when a current is applied to coil 14a, a force parallel to the X-axis (see FIG. 8(A)) is generated. Similarly, when a current is applied to coil 14b, a force parallel to the Y-axis (see FIG. 8(A)) is generated.

Figure 10:
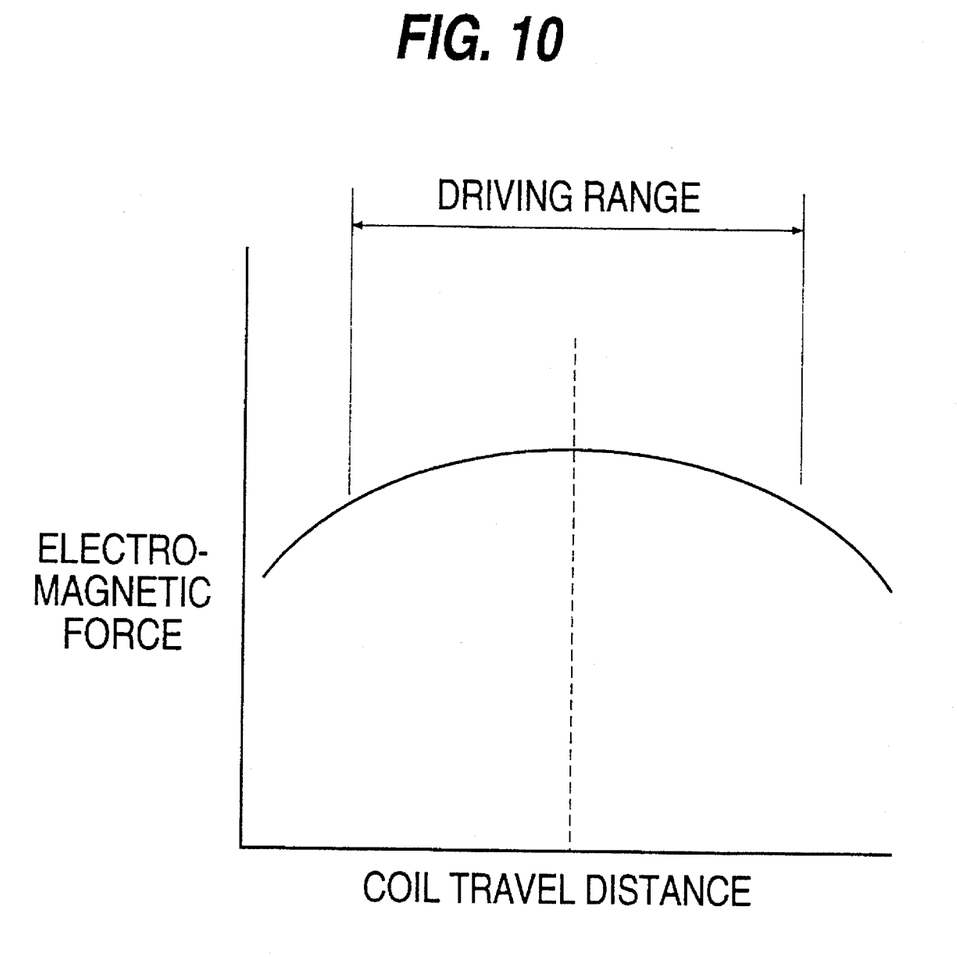
FIG. 10 is a diagram illustrating the relationship between the travel distance of a coil of an image blur suppression device and the electromagnetic force generated, according to an embodiment of the present invention.

FIG. 10 is a diagram illustrating the relationship between the travel distance of a coil of an image blur suppression device and the electromagnetic force generated, according to an embodiment of the present invention. More specifically, FIG. 10 illustrates the relationship between the travel distance of coil 14 and the generated magnetic force. From FIG. 10, it is clear that the generated magnetic force reaches its maximum when the center of coil 14 coincides with the magnetic center of magnet 12.

Figure 11:
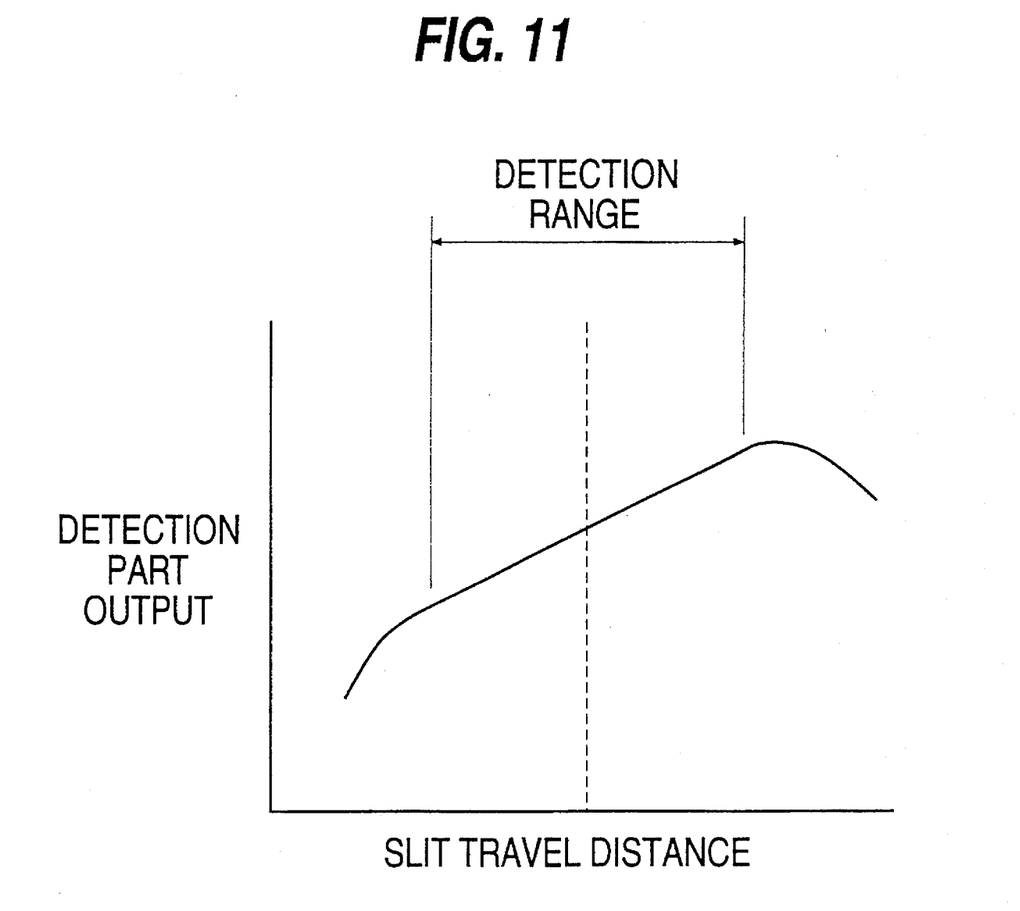
FIG. 11 is a diagram illustrating the relationship between the travel distance of a slit for detecting lens position and the output of a position detection sensor in a camera according to an embodiment of the present invention.

FIG. 11 is a diagram illustrating the relation between the travel distance of a slit for detecting lens position and the output of a position detection sensor in a camera according to an embodiment of the present invention. More specifically, FIG. 11 illustrates the relationship between the travel distance of slit 16a-1 and the output of position detection sensor 18a. The range where the output of position detection sensor 18a is in a linear relationship to the position of slit 16a-1 is chosen as the detection range. FIG. 11 also represents the relationship between the travel distance of slit 16b-1 and the output of position detection sensor 18b. Thus, the range where the output position of detection sensor 18b is in a linear relationship to the position of slit 16b-1 is chosen as the detection range.

Consequently, according to an embodiment of the present invention, the drive force for driving image blur suppression lens 10 can be increased during the centering process. Therefore, the electricity consumption for driving image blur suppression lens 10 is reduced when the optical axis I of photographic optical system 250 is parallel to the ground. Also, the centering process time is reduced. Moreover, when the optical axis I of photographic optical system 250 is positioned approximately parallel to the earth's surface, the magnetic center of magnet 12 can be positioned to coincide with the winding center of coil 14, and the center of the opening of slit 16a-1 and 16b-1 can be positioned to coincide with the center of the light receiving range of position detection sensor 18a and 18b, respectively. Even if only the center of one of the opening of slit 16a-1 and 16b-1 coincides with the center of the light receiving range of position detection sensor 18a or 18b, respectively, and the magnetic center of magnet 12 does not coincide with the winding center of coil 14, a similar effect can be obtained. Moreover, even if only the centers of the opening of slit 16a-1 and 16b-1 do not coincide with the centers of the light receiving range of position detection sensor 18a and 18b, respectively, and the magnetic center of magnet 12 coincides with the winding center of coil 14, a similar effect can be obtained.

According to an embodiment of the present invention, the magnetic center of magnet 12 approaches the winding center of coil 14 under a normal photographing circumstance where photographic optical system 250 is parallel to the ground. Therefore, the drive force required to drive image blur suppression lens 10 during the centering process can be maintained constant, and the electricity consumption during the drive is reduced.

Moreover, according to an embodiment of the present invention, the driving force required to drive image blur suppression lens 10 is maximized during the centering process, thereby minimizing the electricity consumption during the drive when photographic optical system 250 is parallel to the ground in the most common photographic posture.

According to embodiments of the present invention, the time required for the centering process of image blur suppression lens 10 is reduced, thereby allowing a speedier centering process as the center of the light receiving range of the light receiving element approaches the center of the opening of the slit under normal photographing conditions. Furthermore, according to embodiments of the present invention, the time required for the centering process is minimized in the most popular photographing posture (that is, when the photographic optical system is perpendicular to the ground).

According to embodiments of the present invention, electromagnetic actuator 48 generates an electromagnetic drive force to move image blur suppression lens 10. Electromagnetic actuator 48 includes magnet 12 fixed to a prescribed member (such as bottom plate 20), and coil 14 connected to image blur suppression lens 10. An electrical current is applied to coil 14. Magnet 12 and coil 14 are arranged, based on the amount of sag of support rods 11 caused by gravity, so that the magnetic center of magnet 12 is off the center of the winding of coil 14 when the deformation of support rod 11 is approximately zero. Also, magnet 12 and coil 14 are arranged so that the magnetic center of magnet 12 approximately aligns with the winding center of coil 14 due to the sag of support rod 11 caused by gravity when the optical axis I of photographic optical system 250 is positioned approximately perpendicular to the earth's surface.

According to an embodiment of the present invention, a position detection unit detects the position of image blur suppression lens 10. Position detection unit includes light emitting element (for example, LED 17a) and a light receiving element (for example, light receiving device 18a) both affixed on prescribed members, and a slit forming member (for example, slit part 16a) connected to image blur suppression lens 10 and on which a slit (for example, slit 16a-1) is formed in such a way that light radiated from the light emitting element can pass through the slit. The light receiving element and the slit are mounted in such a way, based on the amount of sag caused by gravity, so that the center of the light receiving range of the light receiving element is off the center of the opening of the slit when the deformation of support rod 11 is approximately zero.

Moreover, according to an embodiment of the present invention, the position detection unit and the slit are mounted in such a way that the center of the light receiving range of the light receiving element aligns with the center of the opening of the slit due to the sag of supporting rod 11 when the optical axis I of the photographic optical system is positioned approximately parallel to the earth's surface.

According to embodiments of the present invention, the magnetic center of magnet 12 and the winding center of coil 14 are offset by the amount of the expected sag of support rod 11. Under a normal photographing circumstance when photographic optical system 250 is parallel to the ground, the magnetic center of magnet 12 approaches the winding center of coil 14 due to the sag of support rod 11.

According to embodiments of the present invention, the center of the light receiving range of the light receiving element and the center of the opening of the slit are originally offset with respect to each other by the amount of the expected sag. Under normal photographing circumstances when the optical axis I of the photographic optical axis is parallel to the ground, the center of the light receiving range of the light receiving element approaches the center of the opening of the slit.

In the above embodiments of the present invention, four support rods 11 support image blur suppression lens 10. However, any number of support rods can be used. In addition, other methods and structures can be utilized as long as they can support image blur suppression lens 10 in such a way that image blur suppression lens 10 can be moved approximately perpendicular to the optical axis of the photographic optical system. Thus, a supporting member does not have to be a support rod.

The above embodiments of the present invention are described as suppressing image blur of an image on "film".

However, the present invention is not limited to suppressing image blur of images on "film", and can be used to compensate image blur of an image on virtually any type of image recording medium, such as an optical disk or CCD sensor.

The above embodiments of the present invention are described as relating to a camera. However, the above embodiments of the present invention can be applied to virtually any type of image blur suppression device and is not intended to be applied only to a camera. For example, an image blur suppression device can be applied to telescopes, microscopes, camcorders, motion picture cameras, binoculars, rangefinding equipment, lasers, fiber optic communication systems, various optical projection systems, CD mastering systems and other optical devices to compensate for image blur or motions causing image blur. Therefore, the above embodiments of the present invention describe a "photographic optical system 250". However, "photographic optical system 250" can be described as referring to a "main optical system" and is not intended to be limited to a photographic optical system in a camera.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. An image blur suppression device comprising:

a main optical system having an optical axis;

an image blur suppression lens having an optical center, the image blur suppression lens being moveable to compensate for image blur; and a supporting member supporting the image blur suppression lens and experiencing sag due to weight of the image blur suppression lens and the supporting member, the image blur suppression lens being positioned to approximately align the optical center of the image blur suppression lens with the optical axis of the main optical system in accordance with the amount of sag of the supporting member;

wherein the main optical system is positionable at a first position where the supporting member experiences approximately no sag, and at a second position where the supporting member experiences sag, the optical center of the image blur suppression lens being offset from the optical axis of the main optical system when the main optical system is positioned at the first position.

2. An image blur suppression device as in claim 1, wherein the image blur suppression lens is positioned so that the sag of the supporting member causes the optical center of the image blur suppression lens to be approximately aligned with the optical axis of the main optical system when the main optical system is positioned at the second position.

3. An image blur suppression device as in claim 1, wherein the first position corresponds to the optical axis of the main optical system being approximately perpendicular to the surface of the earth, and the second position corresponds to the optical axis of the main optical system being approximately parallel to the surface of the earth.

4. An image blur suppression device as in claim 2, wherein the first position corresponds to the optical axis of the main optical system being approximately perpendicular to the surface of the earth, and the second position corresponds to the optical axis of the main optical system being approximately parallel to the surface of the earth.

5. An image blur suppression device as in claim 2, wherein the image blur suppression device comprises an image blur suppression device to prevent image blur of photographic images in a camera.

6. An image blur suppression device comprising:

an image blur suppression lens having an optical center, the image blur suppression lens being moveable to compensate for image blur and having a range of motion;

a supporting member supporting the image blur suppression lens and experiencing sag due to weight of the image blur suppression lens and the supporting member, the image blur suppression lens being positioned to approximately align the optical center of the image blur suppression lens with the center of the range of motion of the image blur suppression lens in accordance with the amount of sag of the supporting member; and a main optical system positionable at a first position where the supporting member experiences approximately no sag, and at a second position where the supporting member experiences sag, the optical center of the image blur suppression lens being offset from the center of the range of motion of the image blur suppression lens when the main optical system is positioned at the first position.

7. An image blur suppression device as in claim 6, wherein the image blur suppression lens is positioned so that the sag of the supporting member causes the optical center of the image blur suppression lens to be approximately aligned with the center of the range of motion of the image blur suppression lens when the main optical system is positioned at the second position.

8. An image blur suppression device as in claim 6, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

9. An image blur suppression device as in claim 7, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

10. An image blur suppression device as in claim 6, wherein the image blur suppression device comprises an image blur suppression device to prevent image blur of photographic images in a camera.

11. An image blur suppression device comprising:

an image blur suppression lens, moveable to compensate for image blur;

a drive force generator including a magnet and a coil, the coil having a winding and the winding having a center, one of the magnet and the coil being fixed to the image blur suppression lens, the drive force generator generating an electromagnetic force between the magnet and the coil to move the image blur suppression lens;

a supporting member supporting the image blur suppression lens and experiencing sag due to weight of the image blur suppression lens and the supporting member, the image blur suppression lens being positioned to approximately align the magnetic center of the magnet with the center of the winding of the coil in accordance with the amount of sag of the supporting member; and a main optical system positionable at a first position where the supporting member experiences approximately no sag, and at a second position where the supporting member experiences sag, the magnet center of the magnet being offset from the center of the winding of the coil when the main optical system is positioned at the first position.

12. An image blur suppression device as in claim 11, wherein the image blur suppression lens is positioned so that the sag of the supporting member causes the magnet center of the magnet to be approximately aligned with the center of the winding of the coil when the main optical system is positioned at the second position.

13. An image blur suppression device as in claim 11, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

14. An image blur suppression device as in claim 12, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

15. An image blur suppression device as in claim 11, wherein the image blur suppression device comprises an image blur suppression device to prevent image blur of photographic images in a camera.

16. An image blur suppression device comprising:

an image blur suppression lens, moveable to compensate for image blur;

a position detecting unit including a light emitting element, a light receiving element having a light receiving range, and a slit forming member having a slit and being positioned between the light emitting element and the light receiving element, the slit forming member being connected to the image blur suppression lens, the position detection unit detecting the position of the image blur suppression lens by emitting light from the light emitting unit, through the slit of the slit forming member, and to the light receiving element;

a supporting member supporting the image blur suppression lens and experiencing sag due to weight of the image blur suppression lens and the supporting member, the image blur suppression lens being positioned to approximately align the center of the light receiving range of the light receiving element with the approximate center of the slit of the slit forming member in accordance with the amount of sag of the supporting member; and a main optical system positionable at a first position where the supporting member experiences approximately no sag, and at a second position where the supporting member experiences sag, the center of the light receiving range of the light receiving element being offset from the center of the slit of the slit forming member when the main optical system is positioned at the first position.

17. An image blur suppression device as in claim 16, wherein the image blur suppression lens is positioned so that the sag of the supporting member causes the center of the light receiving range of the light receiving element to be approximately aligned with the center of the slit of the slit forming member when the main optical system is positioned at the second position.

18. An image blur suppression device as in claim 16, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

19. An image blur suppression device as in claim 17, wherein the main optical system has an optical axis, the first position corresponds to the optical axis of the main optical system being approximately perpendicular to the surface of the earth, and the second position corresponds to the optical axis of the main optical system being approximately parallel to the surface of the earth.

20. An image blur suppression device as in claim 16, wherein the image blur suppression device comprises an image blur suppression device to prevent image blur of photographic images in a camera.

\* \* \* \* \*